FAILURE DETECTING APPARATUS

Filed May 25, 1959 3 Sheets-Sheet 1

INVENTOR
R. J. FULMER
BY R. O. Nimz
ATTORNEY

July 3, 1962 R. J. FULMER 3,042,752

FAILURE DETECTING APPARATUS

Filed May 25, 1959 3 Sheets-Sheet 2

INVENTOR
R. J. FULMER

BY R. O. Nimz
ATTORNEY

INVENTOR
R. J. FULMER
BY R. O. Nimtz
ATTORNEY

United States Patent Office 3,042,752

Patented July 3, 1962

3,042,752

FAILURE DETECTING APPARATUS

Robert J. Fulmer, Summit, N.J., assignor to Bell Telephone Laboratories, Incorporated, New York, N.Y., a corporation of New York Filed May 25, 1959, Ser. No. 815,578
14 Claims. (Cl. 179—15)

This invention relates to signal transmission systems and, more particularly, to the detection of transmission line faults in a time assignment speech interpolation system.

In the use of expensive transmission facilities such as the channels in a transatlantic cable, it is important to make full use of all of the available channel time. Time assignment speech interpolation systems have therefore been proposed to take advantage of the statistical fact that telephone conversations, on the average, make use of the transmission facilities for less than one-third of the time. By interconnecting the parties only when one of the parties is actively engaged in emitting speech, large savings in channel time may be effected. One such time assignment speech interpolation (TASI) system is disclosed in the copending application of A. R. Kolding and G. N. Packard, Serial No. 762,779, filed September 23, 1958, since matured into U.S. Patent 2,957,246 issued October 25, 1960.

In the TASI systems of the type described above, connections are made at the transmitting end of the system on the basis of speech activity. These connections are duplicated at the receiving end by means of coded signals sent over the transmission channel preceding the speech fragments. As disclosed in the above-mentioned application of Kolding and Packard, disconnection signals to take down these connections at the receiver, and error correcting signals to verify the accuracy of these connections, may be sent over a separate control channel.

In the type of system disclosed above, it is particularly important that failures in the transmission channels be quickly noted and the faulty channel removed from service. Since speech fragments from a large number of different talkers are being transmitted on each channel, a correspondingly large number of different telephone conversations will be degraded in quality or made unintelligible by a single channel failure. This is in contrast to the usual case where a single channel failure results in the loss of only a single telephone conversation.

It is a common practice to monitor the operation of transmission channels by means of pilot signals transmitted in a narrow portion of the transmission band. These pilot signals are detected at the receiving end of the channels and are used as an indication of the operativeness of the channels. In a TASI system, however, the channels are of limited bandwidth intended only for speech transmission. Furthermore, in transmission systems where TASI facilities are the most feasible, such as transatlantic cable systems, bandwidth is at a premium and the required bands for individual channel pilot tones are costly.

It is therefore an object of the present invention to detect failures of the transmission channels of a transmission system without the use of pilot signals.

It is another object of the invention to detect failures in the transmission channels of a time assignment speech interpolation system without increasing the bandwidth requirements of these channels.

It is a more specific object of the invention to utilize the supervisory signals normally present in a time assignment speech interpolation system as an indication of the operativeness of the transmission channels in such a system.

It is yet another object of the invention to simultaneously maintain an instantaneous count of the number of faults on each channel of a time assignment speech interpolation system.

In accordance with the present invention, receipt of the connection signal indicating which listener is to be connected to a channel is used as an indication of the operativeness of that channel. The disconnection and error correction signals received over a separate control channel are compared to the connection signal and any disparities are recognized as indicating a channel fault. That is, an order received over the control channel to disconnect a particular transmission channel which, in fact, is not actually connected to any listener indicates that the connect signal was not received and that the transmission channel is therefore faulty in some way. Similarly, an error correction signal indicating that a particular channel should be connected to a particular listener when that channel is not, in fact, connected to any listener, is also interpreted as a channel fault.

In further accord with the present invention, to avoid an alarm indication over what may be a single momentary opening of a transmission channel, a counting circuit is provided to count only successive faults and to operate an alarm only if a given number of successive faults occurs. A sub-combination of the present invention comprises a time divided counting circuit for simultaneously counting faults for all of the channels with a common counting circuit.

The most important advantage of the present invention resides in its ability to detect channel faults without burdening the limited channel bandwidth available in expensive transmission facilities such as transoceanic undersea cables.

These and other objects and features, the nature of the present invention and its various advantages, will appear more fully upon consideration of the attached drawings and of the following detailed description of these drawings.

As discussed in the introduction, the object of a time assignment speech interpolation system is to save channel time by assigning channels to talkers and listeners only when the channels are actually required, i.e., when the talkers are actively engaged in talking or making a "speech spurt." In the TASI system to be described below, time division switching techniques are utilized to make the connections between the telephone subscribers and the transmission channels. The connections between the talkers and the transmitting ends of the transmission channels, and the connections between the listeners and the receiver ends of the transmission channels are each effected through a universal-access, time-divided switching arrangement in which there is assigned one channel time slot for each speech channel interconnecting the transmitter and the receiver. A particular talker is "connected" to a channel by simultaneously gating the talker line and the transmission channel onto a common time-divided transmission bus for the same channel time slot interval and by repeating this gating operation at an eight kilocycle rate. Continuity of assignments of channels to a particular talker-listener pair for the duration of a speech spurt and thereafter is accomplished by memory units at the transmitter and at the receiver which control the party-to-channel gating operations.

Figure 1:
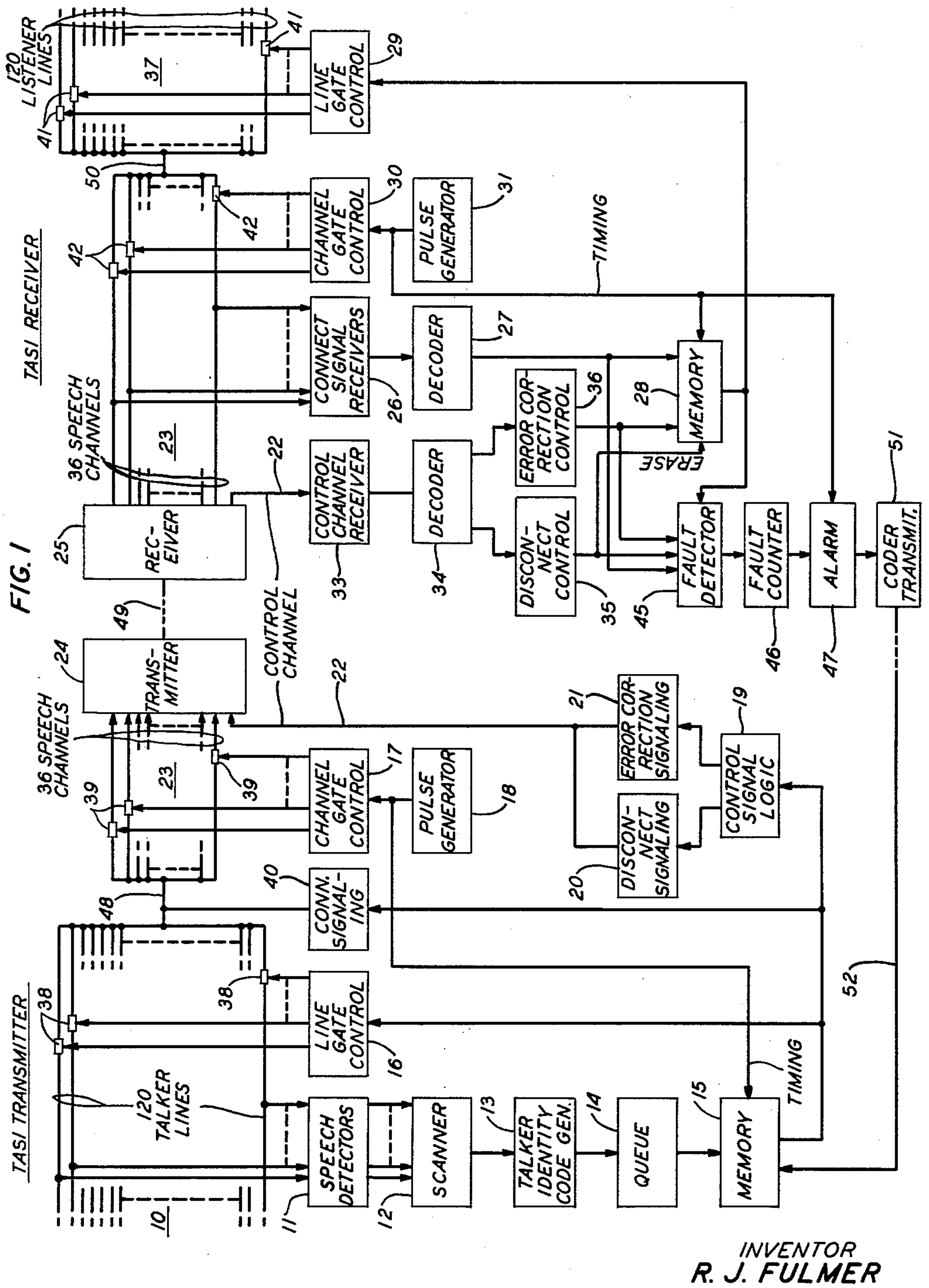
FIG. 1 is a general block diagram of a time assignment speech interpolation system incorporating channel fault detecting circuits in accordance with the present invention.

Referring first to FIG. 1 of the drawings, there is shown a schematic block diagram of a time assignment speech interpolation system embodying the fault detecting circuits of the present invention. The system comprises a TASI transmitter and a TASI receiver which cooperate to interconnect a number of talker-listener pairs, one hundred and twenty in the illustrative embodiment, over an interconnecting transmission facility having a lesser number of transmission channels, thirty-seven in the illustrative embodiment. It will be understood that the system illustrated in FIG. 1 is capable of transmitting interpolated signals in one direction only. Two of such systems, one extending in each direction, are required to furnish a complete two-way communication system.

At the left of FIG. 1 there are shown a plurality of talker lines 10 which comprise the input to the TASI system. For convenience this number has been assumed to be one hundred and twenty although the invention is equally applicable to any number of input lines. A bank 11 of speech detectors is provided to monitor the speech activity of each of the one hundred and twenty talker lines. There is thus provided continuous indications of the speech activity of each of these lines. A scanning circuit 12 continuously "looks at" the outputs of the speech detectors 11. This may be accomplished, for example, by systematically checking each speech detector output, proceeding sequentially through all of the speech detectors. The details of such a scanning arrangement are described in the Kolding and Packard application above mentioned.

Each time scanning circuit 12 locates an active indication on a speech detector output, a signal is applied to code generator 13 which generates a binary code representative of the particular talker line which is active. Code generator 13 is therefore capable of generating one hundred and twenty different binary codes, one to identify each of the input talker lines. These codes are registered in a queuing circuit 14 which serves to store the talker identity codes in the same order in which they are generated. To this end, queuing circuit 14 has a plurality of stages of storage and is provided with means for moving the binary codes from stage to stage.

When there is room available, each of the stored talker identity codes is transferred from queuing circuit 14 into a memory circuit 15. Memory circuit 15 has one storage position for each speech channel in the interconnecting transmission facility, thirty-six in the illustrative embodiment (the thirty-seventh transmission channel is used for control signaling, to be described). Since the number of storage positions in memory 15 is less than the total number of input lines, there will not always be a storage position available for new identity codes. Queuing circuit 14 therefore acts as a buffer store to hold codes of newly active talkers until room is available and, furthermore, stores these codes in the exact order in which they are generated, i.e., it forms a "queue" of talker identity codes.

Memory circuit 15 is provided with a non-destructive readout mechanism which sequentially reads out all of the talker identity codes stored therein. The codes thus read out are applied to a line gate control circuit 16 which serves to operate a plurality of talker gates 38, one of which is connected in series with each talker line. Since each of the output codes from memory circuit 15 uniquely identifies a particular talker line, these talker identity codes can be used by control circuit 16, to close only the gate of the identified talker line. Furthermore, since the entire contents of memory circuit 15 are applied to line gate control circuit 16 in sequence, the line gates 38 of active talkers are also operated sequentially in response to the talker identity codes.

The output of memory circuit 15 is also applied to a connect signaling circuit 40. Circuit 40 generates a signal identifying each newly active talker to be connected to the system and applies this signal to a common switching bus 48. This connect signal is used in remote receiving equipment to connect the appropriate listener to each transmission channel. The connect signals precede the speech signals of the talker they identify on the same transmission channel.

The gating arrangement described above forms the input portion of a time-divided multiplex switching system. The outputs of all of the one hundred and twenty gates 38 are connected to a common switching bus 48 to which there are also connected a plurality of speech channels 23. The number of such speech channels is determined by the average speech distribution on input talker lines 10. It has been found that average speech includes a sufficiently high percentage of silent periods to permit the interpolation of this speech on only one-third as many speech channels. For convenience, the number of speech channels has therefore been illustrated as thirty-six. Clearly, however, this number is not essential and may be greater or less than thirty-six depending on the average speech activity of the talkers.

Channel gates 39 are included in these speech channels and serve to gate speech signals from bus 108 onto the individual speech channels. These gates are controlled by channel gate control circuit 17 which in turn is driven by a pulse generator 18. Channel gate control circuit 17 enables the channel gates 39 in regular succession and recurrently. The pulse rate of generator 18 is chosen such that each of channel gates 39 is enabled once each one hundred and twenty-five microseconds, i.e., at an eight kilocycle rate. The scanning of memory circuit 15 is synchronized with pulse generator 18 in such a way that each time a channel gate is enabled, a code identifying the talker assigned to the enabled channel is read out from memory circuit 15 and applied to line gate control circuit 16. The appropriate line gate is therefore operated simultaneously with the operation of one of the channel gates.

It can be seen from the above description that line gates 38 serve to derive amplitude modulated pulse samples from the speech signals on lines 10. Each of these pulse samples is delivered by way of bus 48 to one of the speech channels by way of one of the associated channel gates. Since the line gates and channel gates are operated in pairs, successive speech samples from the same talker line are delivered to the same speech channels at an eight kilocycle rate. The original speech signals are reconstructed from these pulse samples by means of low-pass filters in a transmitter 24.

At the TASI transmitter, means are also provided for disconnecting a particular talker from a speech channel to make the channel available for a newly active talker. Only in this way can speech from a number of talkers be interpolated on each of the channels. Memory circuit 15 is therefore also adapted to determine, from speech detectors 11, when a registered talker is not active. This information, together with the talker identity codes stored in memory circuit 15 is applied to a control signal logic circuit 19.

When a channel is to be disconnected from a talker, that is, when a particular talker is inactive and his assigned channel is needed, logic circuit 19 ascertains this fact and applies this information to disconnect signaling circuit 20. Disconnect signaling circuit 20 then generates a signaling code identifying the channel to be disconnected and applies this signaling code to control channel 22. Control channel 22 is also introduced into transmitter 24.

If logic circuit 19 determines that no disconnections are required, error correction signaling circuit 21 is enabled. The function of circuit 21 is to transmit, in succession, all of the talker identity codes registered in memory 15, along with the identifications of the speech channels with which they are being connected. This information is applied to control channel 22 and thence to transmitter 24. The use made of this information will be described hereafter but in general it may be said that the disconnect signals are utilized to disconnect listeners from the remote ends of speech channels 23 while the error correction signals are used to check the routing of the speech signals to the intended listeners and to correct errors which may exist.

Transmitter 24 prepares the speech signals on the thirty-six speech channels and the control signals on control channel 22 for transmission over transmission facility 49. In general, this may require modulation, multiplexing, and any other operation which will enable all thirty-six of the speech signals as well as the control signals to be transmitted over facility 49. Facility 49 may, for example, comprise a broadband submarine cable including a large number of signal repeaters and spanning vast intercontinental distances. For transmission on such a facility, the speech signals on channels 22 and 23 might be multiplexed in frequency and applied as a single broadband signal to the facility. In any case, however, all thirty-six of the speech signals and the control signals are simultaneously transmitted over the facility and recovered by a receiver circuit 25 at the remote end. Receiver 25 delivers the recovered speech signals to the thirty-six speech channels 23 and the control signals to the control channel 22. In effect then, transmitter 24, facility 49 and receiver 25 form a continuous transmission medium connecting each speech channel at the TASI transmitter to a corresponding speech channel at the TASI receiver and connecting the control channel 22 at the transmitter to the control channel at the receiver.

A bank 26 of connect signal receivers is connected to the speech channels at the receiver to monitor these speech channels for connect signals. When a connect signal is originated by circuit 40 in the TASI transmitter, this signal is picked up by one of the connect signal receivers in bank 26 and applied to a decoder 27. Decoder 27 identifies the talker to be connected and transfers this talker identity code to a memory circuit 28. Like memory circuit 15 at the TASI transmitter, memory 28 has thirty-six memory positions or slots and a non-destructive readout mechanism which applies these talker identity codes to a line gate control circuit 29. As before, the codes control the operation of line gates 41 in one hundred and twenty listener lines 37.

Included in each of the speech channels at the TASI receiver is a channel gate 42 which serves to connect each of these speech channels to a common switching bus 50. Channel gates 42 are operated sequentially by a channel gate control circuit 30 under the control of a pulse generator 31. The scanning of memory 28 is synchronized with generator 31 such that a talker identity code is read out of memory 28 each time the channel gate associated with the channel to which it is assigned is operated. These identity codes operate line gates 41 by way of control circuit 29 in synchronism with the operation of the channel gates 42. In this way, speech arriving on the speech channels is sampled by gates 42 and delivered by way of bus 50 and gates 41 to the listener lines. The talker identity codes registered in memory 28 insure that each channel is connected to the proper listener.

A control channel receiver 33 is connected to control channel 22 and receives the control signals transmitted thereover. These signals are decoded by a decoder 34. If a disconnect signal has been received, this information is passed on to a disconnect control circuit 35 which utilizes this information to erase from memory 28 the talker identity code representing the talker being disconnected. Since this code is no longer in memory circuit 28, the corresponding line gate 41 will no longer be operated and the listener will be effectively disconnected from the system.

If an error correction code has been received over control channel 22, decoder 34 supplies this information to an error correction control circuit 36. Circuit 36 utilizes this information to change the talker identity code stored in memory 28 when a disparity exists between the stored code and the error correction code. In this way, errors caused by noise or faulty transmission on the speech channels can be rectified in a reasonable length of time.

The above description is a brief review of the operation of the TASI system shown in the Kolding-Packard application and of the major components by which this operation is accomplished. A more detailed description can be found in that application. It is important, however, to note some of the major characteristics of the described system.

It will be first noted that this TASI system is of the "seize and hold" type. That is, a talker who is connected to a speech channel when he begins talking is not disconnected as soon as he stops talking. On the contrary, each talker retains his channel until that channel is required for another talker. In this way, the amount of control information which must be systematically transmitted to the TASI receiver is greatly reduced. In periods of low load, for example, where there are fewer than one hundred and twenty talkers to be accommodated, each talker may retain the same channel for periods long compared to the length of a talkspurt. Indeed, each talker may retain the same channel for the entire duration of his conversation if less than thirty-six talkers are connected to the system. Since control information need be transmitted only when a disconnection is required, the amount of this information is correspondingly reduced.

It will be further noted that control channel 22 serves two separate functions, the transmission of disconnect signals and the transmission of error correction signals. Disconnect signals always have priority over error correction since these signals are esssential to permit interpolation. During periods of low activity, however, when few disconnections are made, erroneous connections would tend to continue for relatively long periods. It is just at these times, however, that large amounts of error correction information can be transmitted over the control channel to correct erroneous connections.

On the other hand, when the TASI system is loaded heavily with a large number of active talkers, disconnections are made rapidly to continually accommodate newly active talkers. During such periods of high activity, a large amount of disconnection information must be transmitted on the control channel, leaving little time for error correction. During such periods, however, erroneous connections will continue for only very brief intervals after which the erroneous connections will be discontinued due to a disconnection. Hence it is just these times when error correction information is less essential that the rate of transmission of this information is decreased.

It will be further noted that, although the multiplex switching operation is a highly synchronized one, the two switching operations at the TASI transmitter and the TASI receiver need not be synchronized at all. This is possible because continuous speech waves of at least syllabic duration are reconstructed from the switched pulse samples before transmission. For this reason, no synchronizing information need be transmitted between the transmitter and the receiver. In fact, no control information except the above-described connect, disconnect and error correction signals need be relayed to the receiver.

In accordance with the present invention, the faulty operation of any one of the thirty-six speech transmission channels 23 is detected by utilizing the supervisory control signals normally present in the TASI system, without further hindering the transmission capacity of these channels by pilot signals and the like.

It will be first noted that three types of supervisory signals are present in the TASI system. The first of these, called connect signals, arrive over the speech transmission channels preceding each newly connected talker's speech. The purpose of the connect signal is to identify the listener for whom this particular segment of speech is intended. To this end, the connect signals are received in connect signal receivers 26, decoded in decoder circuit 27 and written into memory 28 in a position unique to the channels over which they were received. It is apparent that a fault in one of the transmission channels will result in the loss or mutilation of the connect signals transmitted on the faulty channel. This, in turn, will cause the switching circuits to connect the following speech to the wrong listener or to no listener at all.

The other two classes of supervisory signals are disconnect signals and error correction signals, both of which arrive over the control channel 22. Each disconnect signal identifies a particular channel which is to be disconnected from the listener to which it was previously connected. This disconnection is simply accomplished by erasing the proper identity code from the receiver memory 28.

Each error correction signal comprises the identification of a particular channel and an identification of a particular talker who is currently connected to that channel. If the information stored in memory 28 does not agree with this error correction information, the code stored in memory 28 is altered to agree therewith.

A fault may occur in a transmission channel due to an interruption in the transmission medium 49, a malfunctioning in the transmitter 24 or the receiver 25, or a malfuctioning in the TASI connect signaling circuits 16 or connect signal receiving circuits 26. Each of these faults may result in blocking connect signaling information, either momentarily or on a long term basis. In any case, any such fault may result in no connect signal, or an improper connect signal, being registered at the TASI receiver. The listener, therefore, will not receive the speech intended for him. The error correcting circuits will, of course, correct this situation after a short lapse of time, but if the channel is not operative, the speech will still be lost.

In accordance with the present invention, channel failures are detected by comparing the received codes, stored in memory 28, with the disconnect and error correction signals received over control channel 22. If, for example, a disconnect signal is received for a channel which is already in the idle condition, it is obvious that a connect signal intended to set up a connection was somehow lost. Similarly, if an error correction signal is received indicating that a certain channel should be connected to a certain listener, when in fact that channel is not connected to any listener, the loss of a connect signal is likewise indicated. These disparities in supervisory signals are therefore interpreted as channel faults. In FIG. 1, a fault detecting circuit 45 registers these faults.

As noted above, however, channel faults may be only momentary in nature, caused, for example, by fading in a radio relay. It would be undesirable to disconnect the channel when the fault is not of a permanent type. In further accord with the invention, a fault counting circuit 46 is provided to count the number of successive faults on each transmission channel. When the number of successive faults reaches a preselected maximum, four for example, fault counter 46 signals an alarm circuit 47 to operate an alarm to alert attendant personnel and, if desired, to automatically remove the faulty channel from service. Thus the alarm signals are introduced into a coder-transmitter 51 which encodes these signals in a form suitable for transmission and transmits this code over a return transmission facility 52. These codes are applied to memory 15 at the TASI transmitter to mark the failed channel as unavailable and thus remove it from service.

Figure 2:
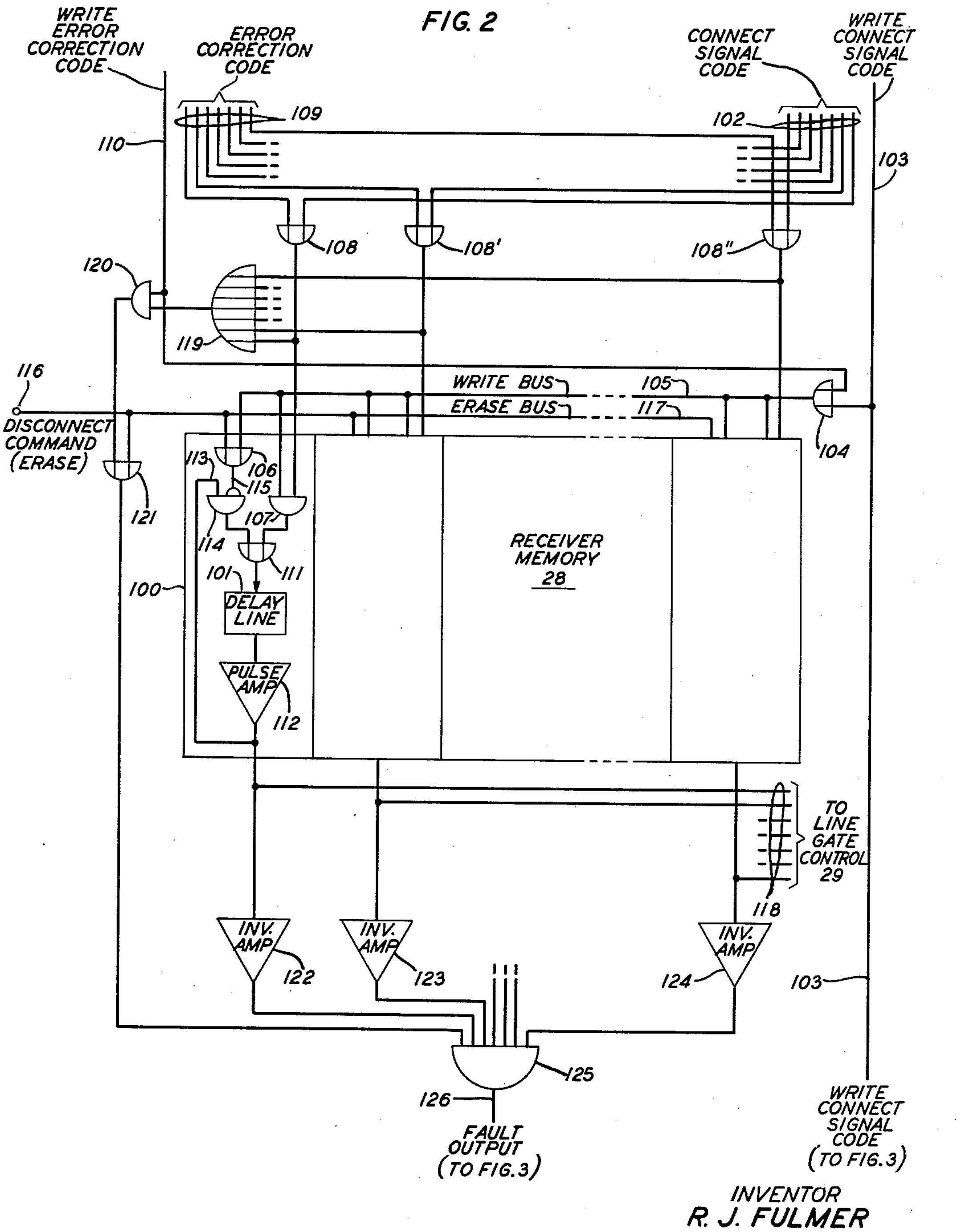
FIG. 2 is a more detailed circuit diagram of the fault detecting circuit disclosed in FIG. 1.

Having described a TASI system in which the present invention finds advantageous application, a description will now be given of the detailed circuitry of the channel fault detecting and alarming circuits of the present invention. In FIG. 2, then, there is shown a detailed schematic diagram of the fault detecting circuit shown schematically in FIG. 1 as fault detector 45. Memory circuit 28 is shown in more detail in FIG. 2 to better illustrate the operation of the fault detecting circuits. Thus, memory circut 28 is made up of a plurality of memory cells similar to memory cell 100. Indeed, one such memory cell is provided for each binary bit of the codes to be stored. The bit storage element of memory cell 100 is a delay line 101 in which a plurality of bits representing a corresponding one digit of a plurality of binary codes are continuously recirculated. A similar delay line is provided in each memory cell to accommodate the remaining digits of these binary codes.

Access to delay line 101 is provided through a series of logical gates which route and control various signals to be entered. A binary code derived from the connect signals received over a transmission channel appears on seven parallel digit leads 102 along with a write command on control lead 103. The purpose of the write command is to write the connect signal code in the proper time slot in memory 28. This write command is applied, through logic OR gate 104, to write bus 105. From write bus 105 the write command is applied simultaneously to each memory cell of memory 28. In cell 100, for example, this write command is applied to OR gate 106 and AND gate 107. OR gates 104 and 106 are logic type gates which present a signal on their output lead when a signal is applied to any one or more of their input leads. AND gate 107 is a logic gate of the type which presents a signal on its output lead when, and only when, a signal is simultaneously applied to all of its input leads.

Also applied as an input to AND gate 107 is one of the digit leads 102, applied through an OR gate 108. The other input to OR gate 108 comprises one of seven digit leads 109 on which there will appear, in parallel, a binary code from the error correction circuits. The remaining ones of digit leads 102 and of digit leads 109 are applied through OR gates 108′ . . . 108″ to corresponding cells of memory 28. An error correction write command appears on control lead 110 along with the error correction code on digit leads 109 to time slot the error correction code. The error correction write command is also applied through OR gate 104 to write bus 105.

An error correction or connect signal code, accompanied by a write command, will cause the simultaneous energization of both inputs to AND gate 107 provided the digit "1" is to be written into the time slot. If the digit "0" is to be written in, only one input to AND gate 107 is energized and hence no output is produced.

The output of AND gate 107 is applied through OR gate 111 to the input of delay line 101. Hence, a digit "1" which is to be written into memory cell 100 is launched on delay line 101 as a pulse. On leaving delay line 101, this pulse is amplified by pulse amplifier 112 and applied simultaneously to output circuits, to be described, and to input lead 113 of inhibiting gate 114. Gate 114 is of the type which will transmit a signal applied to input lead 113 through to its output lead provided an inhibiting signal is not simultaneously present on lead 115. Hence, in the absence of an inhibiting signal on lead 115, pulses from pulse amplifier 112 are applied through gate 114 and OR gate 111 to the input of delay line 101. Pulses once written into memory cell 100 are therefore continuously reamplified and recirculated through delay line 101 until an inhibiting signal is applied to input lead 115 of gate 114.

Signals on inhibit lead 115 are derived from OR gate 106. As noted above, one input to OR gate 106 is derived from write bus 105. Hence, whenever a command to write a connect signal code or an error correction code arrives, in addition to writing the proper code digit in the memory cell as a pulse on delay line 101, the write command also inhibits the recirculation of the code bit which was previously stored in cell 100. The new connect signal or error correction code bit is, therefore, written in place of the previous code bit. A similar operation takes place in each of the other memory cells for the remaining code bits and hence the entire codes are written, recirculated and erased in synchronism. Delay line 101 simultaneously carries a series of code bits, one for each of the thirty-six transmission channels which are separated in time. Hence, the "time slot" of a channel corresponds to the instant at which the code bit for that channel is being recirculated and, hence, is available for erasure and substitution of a new bit. The write commands on control leads 103 and 110 are keyed to this timing scheme to write the codes in the proper time slots.

A disconnection signal, indicating that the code in a particular time slot is no longer valid, is applied to terminal 116 from the disconnect control circuit 35 in FIG. 1 during the appropriate time slot. This signal is applied to erase bus 117 from which it is applied to OR gates, similar to OR gate 106, in each of the memory cells. The disconnect signal, therefore, serves to inhibit gate 114 and prevents the recirculation of the code in this time slot, thereby erasing the code. Disconnection is thus effected, since the identity code required to complete the connection is no longer available.

The outputs of the memory cells of memory 28 are applied to output conductors 118 which are, in turn, applied to the line gate control circuit 29 of FIG. 1 to control the operation of line gates 41. The contents of memory 28 therefore control the talker connections and provide a convenient means for changing these connections.

In operation, a connect signal is received over a transmission channel as described with reference to FIG. 1. This connect signal is detected, decoded and applied as a parallel binary code to digit leads 102 along with a write command on control lead 103 to write the code in the proper time slot. When thus written into memory 28, this code continues to control the connection of that channel to the identified listener by recirculating the code and, once each circuit, applying the code to output leads 118 to operate the listener gate.

When it is required to connect another talker to this channel, a disconnect signal is sent over control channel 22, detected, decoded and applied as an erase command to erase the code in that particular time slot of memory 28. When not carrying disconnection signals, control channel 22 is used for error correction signals which, when received, are written into memory 28 in place of the previously stored codes.

The above description illustrates one form of memory circuit suitable for the system of FIG. 1. It is clear that many other types of storage arrangements, provided with appropriate read-in, readout and erase mechanisms, would be equally suitable. The specific disclosure given here is to be taken as illustrative and not as limiting.

In accordance with the present invention, faults occurring in the transmission channels of the system of FIG. 1, which result in the loss of a connect signal, are detected by comparing the connect, disconnect and error correction signals. More specifically, a fault is marked each time an error correction code is to be written in a time slot having no previous code, and each time a disconnect erasure is to take place in a time slot having no previous code. As explained above, both of these situations indicate that a connect signal has not been received and hence a channel is faulty.

An OR gate 119 is provided to detect the presence of an error correction code. The seven inputs to OR gate 119 are derived from the outputs of OR gates 108, 108' . . . 108'', carrying the connect signal and error correction codes. A signal on any one or more of these leads, indicating the presence of a code other than all zeros, produces an output from OR gate 119 which is applied to AND gate 120. The other input to AND gate 120 is the error correction write command from control lead 110. An output from AND gate 120, therefore, indicates the receipt of an error correction code other than the all zeros code which is reserved to indicate a disconnected channel.

The output of AND gate 120 and the disconnect signals applied to terminal 116 are both applied to OR gate 121. An output from OR gate 121 therefore indicates that either (1) an error correction code other than all zeros has been received, or (2) a disconnect command has been received.

The outputs of the memory cells of memory 28 are each applied to one of a bank of inverting amplifiers 122, 123, . . . 124. These inverting amplifiers take the signal condition applied to their input and produce at their output the complement of the input. Thus, each digit "1" applied to one of inverters 122, 123, . . . 124 produces a "0" on the inverter output while each digit "0" produces a "1" on the output. Such inverters are well known in the art and will not be further described here.

The outputs of inverting amplifiers 122, 123, . . . 124 are applied as inputs to AND gate 125. The output of OR gate 121 is also applied as an input to AND gate 125. AND gate 125 will, therefore, provide an output only when the output of memory 28 is an all zeros code (converted to all ones by the inverters) and, simultaneously, a disconnect signal or an error correction code, other than all zeros, arrives at the TASI receiver. It will be noted that it is just these situations which indicate a channel fault. The output of AND gate 125 has, therefore, been termed the fault output of the circuit.

Each channel fault occurring in the TASI system is marked by an output on fault output lead 126. Furthermore, the faulty channel is uniquely identified by the time position of the fault marking pulse. This will be apparent when it is recognized that all of the inputs to AND gate 125 are themselves indexed in time to correspond to a particular channel. The correspondence of circumstance required for a fault output can therefore only occur during the time slot assigned to the faulty channel.

From the above description, it can be seen that channel faults in a TASI system can be detected with extremely simple and inexpensive circuitry. Only a small number of gates and inverting circuits are required to accomplish this purpose. All of the rest of the circuitry of FIG. 2 is required for normal operation of the TASI system and hence would be present in any event.

As noted above, a fault can occur in a channel, i.e., a connect signal can be lost, by a momentary interruption in the transmission medium or by other extremely short-lived phenomena. Since the channel may operate excellently immediately after such a momentary fault, it is desirable that service is not discontinued on that channel merely because of a single fault. In further accord with the present invention, means are therefore provided to count the number of successive faults on each channel and to indicate that the channel has permanently failed only after a number of successive faults. Circuits for accomplishing this purpose are disclosed in FIG. 3.

Figure 3:
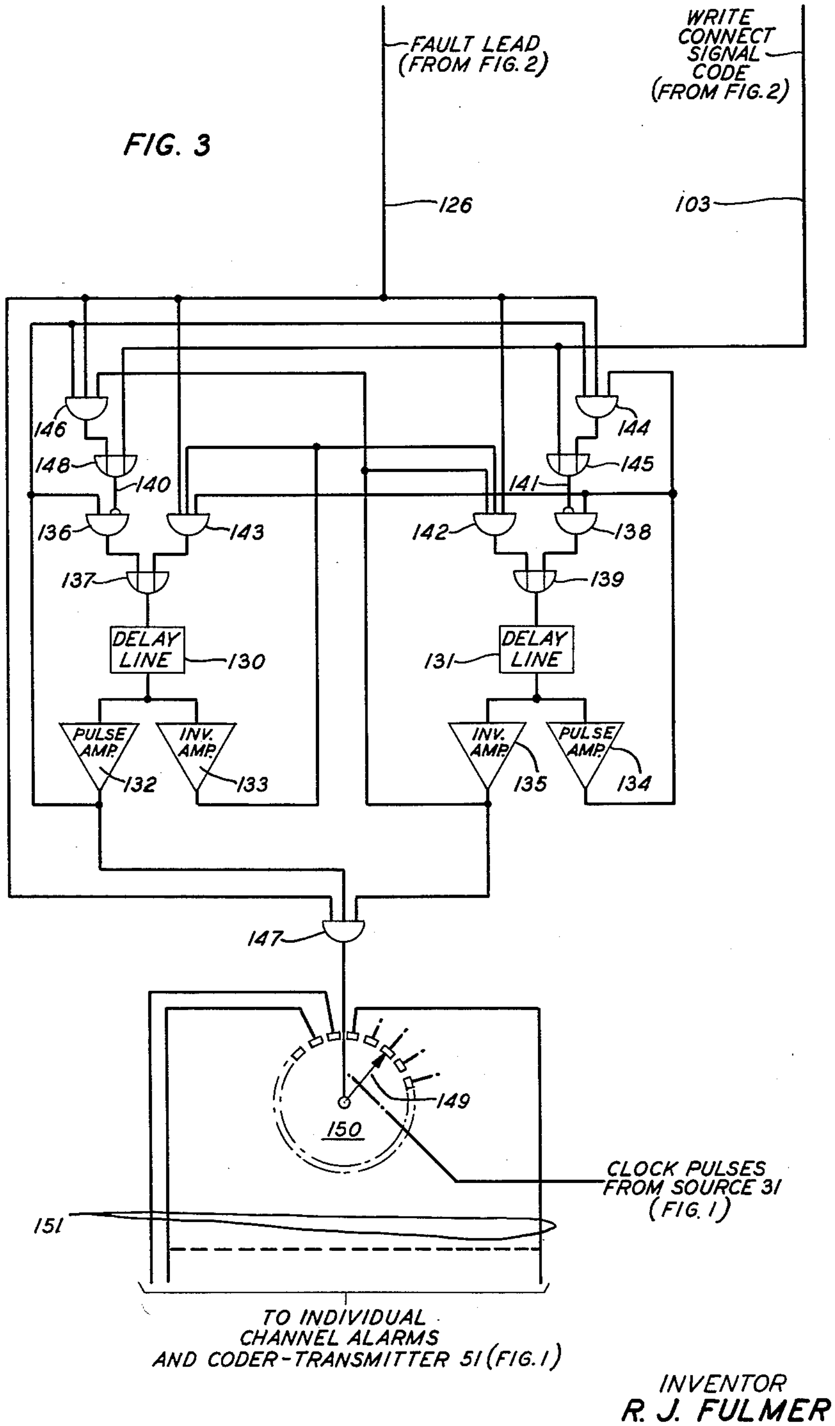
FIG. 3 is a detailed circuit diagram of a time-divided counting circuit and alarm circuit suitable for use with the fault detecting circuits of FIG. 2.

In FIG. 3 there is shown a time-divided counting circuit in accordance with the present invention and suitable for counting the faults detected in the circuit of FIG. 2. The counting circuit of FIG. 3 comprises two delay lines 130 and 131 similar to delay 101 in FIG. 2. These two delay lines are the storage elements for a plurality of two-digit binary codes which are written in and advanced by pulses on fault lead 126 from the fault detector of FIG. 2. Since the faults are time-slotted according to the channel which has failed, it is convenient to time-slot the binary counts of these faults according to the same index. The counts for each channel are therefore launched as pulses on delay lines 130 and 131 by the appropriate logic and recirculated through these delay lines as long as required.

In connection with the binary codes representing the fault counts, it has been found desirable to utilize a cyclical code in which only one code element changes at a time. This cyclic or reflected binary code, sometimes called the Gray code, is tabulated in Table A.

*Table A*

| Fault No.: | Code |
|---|---|
| 0 | 00 |
| 1 | 01 |
| 2 | 11 |
| 3 | 10 |
| 4 | 00 (alarm) |

It will be noted that only one code element changes for each new count. Furthermore, a count of four is required before an alarm is operated. The circuitry to achieve this counting operation and operate the alarm will now be described.

The output of delay line 130 is introduced into a pulse amplifier 132 and an inverting amplifier 133. Similarly, the output of delay line 131 is introduced into pulse amplifier 134 and inverting amplifier 135. In this way, the complements of the output digits, as well as the digits themselves, are made available to perform the necessary logic.

As described with reference to the cells of memory 28 in FIG. 2, each delay line is provided with a loop which returns its output back to its input in the absence of an inhibiting signal. Thus, the output of pulse amplifier 132 is applied to inhibiting gate 136 and thence to OR gate 137 and the input of delay line 130. Similarly, the output of pulse amplifier 134 is applied to inhibiting gate 138 and thence to OR gate 139 and the input of delay line 131. A digit stored in either of these delay lines will therefore continue to circulate indefinitely until inhibited by a signal on lead 140, for delay line 130, or lead 141, for delay line 131.

Assuming initially that all of the code digits stored in delay lines 130 and 131 are zeros, the arrival of a pulse on lead 126, indicating a fault, will be applied to AND gate 142. Also applied to AND gate 142 are the complemented outputs of delay lines 130 and 131, derived by inverting amplifiers 133 and 135, respectively. Since both of the stored digits are zeros, the inverting amplifiers 133 and 135 will convert them to ones and complete the enablement of AND gate 142. The output of AND gate 142 is applied through OR gate 139 to launch a pulse on delay lines 131. The code stored in this time slot is therefore "01," indicating that one fault has been registered for this channel.

If the fault continues up to the next time slot allotted to this channel, the fault indicating pulse on lead 126 is applied to AND gate 143. Also applied to AND gate 143 is the output of delay line 131, from pulse amplifier 134, and the inverted output of delay line 130, from inverting amplifier 133. A "01" code in this time slot will therefore complete the enablement of AND gate 143 and launch a pulse on delay line 130 by way of OR gate 137. The new code stored in this time slot is therefore "11," indicating that two faults have been registered for this channel.

If a fault is again marked for this channel in the appropriate time slot, the pulse on fault lead 126 is applied to AND gate 144. Also applied to AND gate 144 are the outputs from delay lines 130 and 131, derived from pulse amplifiers 132 and 134. An "11" code in this time slot will therefore complete the enablement of AND gate 144, producing an output which is applied to OR gate 145. The output of OR gate 145 is applied to inhibit lead 141 to inhibit gate 138 and prevent the recirculation of the "1" pulse in delay line 131. The new code in this time slot is therefore "10," indicating that three faults have been registered for this channel.

If a fourth fault is marked for this channel in the appropriate time slot, the pulse on fault lead 126 is applied to AND gate 146 and to AND gate 147. Also applied to AND gates 146 and 147 are the output of delay line 130, from pulse amplifier 132, and the inverted output of delay line 131, from inverting amplifier 135. A "10" code stored in this time slot will therefore complete the enablement of AND gates 146 and 147. The output of AND gate 147 indicates that four faults have been registered for the channel assigned to this time slot. This output therefore is used to operate an appropriate alarm in the manner to be described.

The output of AND gate 146 is applied to OR gate 148 the output of which is, in turn, applied to inhibit lead 140 to inhibit gate 136 and prevent the recirculation of the "1" pulse in delay line 131. The code remaining in this time slot is therefore "00," and the counter has been recycled and is ready to count any new faults in this channel.

It will be first noted that the above-described operation pertains to only one time slot and hence pertains to only a single channel. It is to be remembered that similar operations may be concurrently carried on in all of the other time slots. That is, the logic circuitry of FIG. 3 is used in common for counting faults in all thirty-six channels by the simple expedient of separating the operation for different channels into different time slots.

It is to be further noted that successive fault indications need not occur in successive time slots assigned to a single channel. That is, an error in a correction code in memory 28 of FIG. 2, which error results in a fault being registered, will simultaneously be corrected by the error correction code. The second fault will not be detected until the next time a disconnect or error correction is to take place over an all-zeros code. This will not take place until the present talker is disconnected and a new talker should have been connected by a connect signal code. The circulating loops provided for delay lines 130 and 131 store the previous fault count until the next fault is actually detected.

It is to be further noted that the receipt of a connect signal code for a particular channel indicates that that channel is functioning properly. The connect signal write command, appearing on lead 103, is therefore applied to OR gates 145 and 148. The outputs of these OR gates are applied to inhibit gates 138 and 136, respectively, and thus block the further circulation of the fault count for that channel. In this way, the counter is recycled to zero ("00") whenever a received connect signal code indicates that a channel is in proper operating condition.

The output of AND gate 147, indicating that four successive faults have been registered for the channel assigned to that particular time slot, is applied to brush 149 of commutator 150. Commutator 150, illustrated schematically as a mechanical commutator, will in actual practice comprise an electronic commutator of any of the forms known in the art. Its function is to translate the output of AND gate 147 from a pulse appearing in one out of thirty-six time slots to a pulse appearing on one output of thirty-six separate leads 151. To this end, brush 149 of commutator 150 is driven by pulses from source 31 in FIG. 1. It will be remembered that these pulses provide the necessary timing for the time division switch of the TASI system and divide each cycle of memory cells 100 in FIG. 2 into thirty-six time slots. By proper synchronization brush 149 will contact each segment of commutator 150 during one, and only one, of the time slots. Leads 151, of course, are each wired to operate an alarm for the channel assigned to the time slot during which brush 149 rests on the connected commutator segment. Furthermore, leads 151 are introduced into a coder-transmitter such as shown at 51 in FIG. 1. The channel failures are thereby encoded and transmitted to the remote TASI transmitter where the faulty channel is automatically removed from service. This channel may be manually returned to service after the fault has been corrected.

It is to be understood that the above-described arrangements are merely illustrative of the numerous and varied other arrangements which can represent applications of the principles of the invention. Such other arrangements may readily be devised by those skilled in the art without departing from the spirit or the scope of the invention.

What is claimed is:

1. In a time assignment speech interpolation system for interconnecting a plurality of signal sources and utilization devices over a lesser plurality of transmission channels on a time division basis, means for assigning each of said transmission channels to one of said signal sources for at least the duration of a transmitted signal, means for transmitting on each said transmission channel the identification of the utilization device to be connected thereto, separate control channel means, means for transmitting connection supervising signals on said control channel means to change said identification when required, means for comparing each of said identifications and said supervisory signals to ascertain disparities for each said transmission channel, and means responsive to consecutive ones of said disparities to disable each transmission channel causing such consecutive disparities.

2. In a destination-coded transmission system in which information to be transmitted is preceded by a coded identification of the one of a plurality of discrete destinations of said information, means for transmitting correction signals to correct said destination codes from one to another of said plurality of destinations from time to time, means for comparing said coded identifications and said correction signals to ascertain disparities, means for counting the number of consecutive ones of said disparities, and means for disabling that portion of said transmission system to which said consecutive disparities are attributable.

3. The transmission system according to claim 2 wherein said correction signals comprise disconnection signals, and means for counting one disparity each time said disconnection signals call for the disconnection of an unconnected destination.

4. The transmission system according to claim 2 wherein said correction signals comprise error checking signals, and means for counting one disparity each time said error checking signals call for the connection of an unconnected destination.

5. In combination, a transmission channel wherein information to be transmitted is separated into discrete fragments, means for preceding the transmission of each said fragment of information with a coded identification of the destination of said fragment, means for detecting the absence of said coded identifications, means for counting consecutive ones of said absences, and means for disabling said channel when the count in said counting means reaches a preselected maximum.

6. In a time assignment speech interpolation system wherein active ones of a plurality of signal sources are assigned on a time division basis to idle ones of a lesser plurality of transmission channels, means for preceding signals from each of said sources with a coded identification of the originating source, means connected to said transmission channel for detecting said coded identifications, means for generating a fault signal each time one of said coded identifications is absent, means for counting consecutive ones of said fault signals for each of said transmission channels, and means for disabling each of said transmission channels for which a preselected number of consecutive fault signals are thus counted.

7. The combination according to claim 6 wherein said counting means comprises a plurality of multi-bit storage media, each of said storage media having a storage position for each of said transmission channels, means for writing the several bits of a binary number into each of the corresponding storage positions of said media, means responsive to each of said fault signals for advancing only the binary number in the corresponding storage positions, means for detecting a preselected binary number in each of said storage positions, and means for deriving a signal corresponding to the storage position in which said preselected binary number is thus detected.

8. The combination according to claim 7 wherein said storage media each comprises a delay line and said storage positions comprise time displacements of signals launched on said delay lines.

9. Time-divided counting means for counting consecutive events in a plurality of time-divided time slots, which counting means comprises a plurality of delay lines, means for launching signal conditions representative of particular binary counts on said delay lines at times corresponding to each of said time slots, and means responsive to each of said events for altering said signal conditions only in the corresponding time slot to advance the binary count in said corresponding time slot.

10. The time-divided counting means according to claim 9 wherein each of said signal conditions is continuously recirculated through said delay lines until altered.

11. The time-divided counting means according to claim 9 wherein said launching means and said altering means comprise a logic circuit responsive to said events and to the signal conditions on said delay lines, said logic circuit being used at different times for all of said counts.

12. Binary counting means comprising a delay medium, means for launching pulses on said delay medium during each of a plurality of recurrent time periods, means for continuously recirculating pulses through said delay means once launched, means for representing binary counts by the permutations of simultaneously launched pulses, and means for advancing said counts by altering the permutations of simultaneously recirculated pulses.

13. Binary counting means according to claim 12 wherein said advancing means comprises means concurrently responsive to the permutation of pulses to be recirculated and to a simultaneously occurring advancing pulse to change said permutation to a permutation representative of the next higher count before recirculation.

14. In a time assignment speech interpolation system for interconnecting a plurality of signal sources and utilization devices over a lesser plurality of transmission channels on a time division basis, means for assigning each of said transmission channels to one of said signal sources for at least the duration of a transmitted signal, means for transmitting on each said transmission channel the identification of the utilization device to be connected thereto, separate control channel means, means for transmitting connection supervisory signals on said control channel means to change said identification when required, means for comparing each of said identifications and said supervisory signals to ascertain disparities for each said transmission channel, and means for counting successive one of said disparities for each of said transmission channel, said counting means comprising a delay medium, means for launching pulses on said delay medium during each of a plurality of recurrent time periods corresponding to said channels, means for continuously recirculating pulses through said delay medium once launched, means for registering said successive disparities in binary counts by the permutations of simultaneously launched pulses, and means responsive to each said disparity for advancing said counts by altering the permutations of simultaneously recirculated pulses.

References Cited in the file of this patent

UNITED STATES PATENTS

| | | |
|---|---|---|
| 2,516,587 | Peterson | July 25, 1950 |
| 2,541,932 | Melhose | Feb. 13, 1951 |
| 2,749,034 | Williams et al. | June 5, 1956 |
| 2,840,705 | Scully | June 24, 1958 |
| 2,907,829 | Carbrey | Oct. 6, 1959 |